United States Patent [19]
Howson et al.

[11] Patent Number: 5,543,059
[45] Date of Patent: Aug. 6, 1996

[54] ENHANCED REACTIVE METAL WALL FOR DEHALOGENATION OF HYDROCARBONS

[75] Inventors: Paul E. Howson, Latham; Patricia D. Mackenzie, Clifton Park; David P. Horney, Mayfield, all of N.Y.

[73] Assignee: General Electric Company, Schenectady, N.Y.

[21] Appl. No.: 414,832

[22] Filed: Mar. 31, 1995

[51] Int. Cl.$^6$ .......................................................... C02F 1/70
[52] U.S. Cl. .......................... 210/757; 210/908; 210/909; 210/747
[58] Field of Search .................................... 210/757, 908, 210/909, 747

[56] References Cited

U.S. PATENT DOCUMENTS 5,266,213  11/1993  Gillham ................................... 210/747

OTHER PUBLICATIONS

T. Senzaki and Y. Kumagai, "Removal of Organochloro Compounds in Waste–Water by Reductive Treatment–Treatment of 1,1,2,2–tetrachloroethane with Iron Powder", 1988, pp. 1–14.

R W Gilham et al., Metal–Catalyzed Abiotic Degradation of Halogenated Organic Compounds, Waterloo Centre for Groundwater Research, vol. 29, No. 5, Sep.–Oct. 1991 (2 pages).

*Primary Examiner*—Neil McCarthy
*Attorney, Agent, or Firm*—Noreen C. Johnson; James Magee, Jr.

[57] ABSTRACT

A method is provided for remediation of contaminated solutions using a tiered metal wall or column. The tiered metal wall or column has at least three zones with graduated sizes of reducing metal particles. Contaminated solutions pass through the tiered wall or column to dehalogenate contaminant halogenated hydrocarbons.

5 Claims, 2 Drawing Sheets

1

ENHANCED REACTIVE METAL WALL FOR DEHALOGENATION OF HYDROCARBONS

This invention was made with government support under Contract No. DEAC04-94AL85000 awarded by the Department of Energy. The government may have certain rights in this invention.

FIELD OF THE INVENTION

The present invention relates to a method for dehalogenating hydrocarbons in aqueous environments. In particular, the invention relates to a metal wall containing reactive zones that chemically reduce halogenated hydrocarbons found in contaminated groundwaters.

BACKGROUND OF THE INVENTION

Polychlorinated hydrocarbons, such as carbon tetrachloride, chloroform, trichloroethylene, and tetrachloroethylene have been widely used as chemical intermediates, solvents for dry cleaning of clothing, in degreasing operations, and in a variety of other applications. Chlorinated hydrocarbons are very stable compounds and are relatively toxic at low levels. Groundwaters have become contaminated by chlorinated hydrocarbons from sources such as disposal facilities, chemical spills, and leaking underground storage tanks.

Due to this fact, chlorinated hydrocarbons have been accumulating in the environment, particularly in groundwaters. As a result, pollution of water by chlorinated hydrocarbons has become an important environmental problem and contaminated groundwaters represent a large portion of environmental remedial action plans throughout the world. This is partially due to the improved analytical techniques used for detection of chlorinated hydrocarbons in many water supplies.

It is known that chlorinated compounds can be degraded by reductive dechlorination, that is, replacement of chlorine substituents by hydrogen. Metallic elements, such as iron and zinc, have been used to degrade chlorinated organic compounds.

In the patent literature, patents are issued that use metals or metallic couples to degrade chlorinated organic compounds. Recently, researchers in Japan have reported on the degradation of 1,1,2,2-tetrachloroethane and trichloroethylene in aqueous solution in the presence of iron powder: Senzaki, T. and Y. Kumagai, "Removal of Chlorinated Organic Compounds from Wastewater by Reduction Process: II. Treatment of Trichloroethylene with Iron Powder" Kogyo Yosui, 1989, 369, 19–25. Gillham and O'Hannesin in their article "Metal-Catalyzed Abiotic Degradation of Halogenated Organic Compounds" IAH Conference on Modern Trends in Hydrogeology: Hamilton, Ontario, May 10–13, 1992, have confirmed Senzaki's results. Recently, Gillham received a U.S. Pat. No. 5,266,213, for his method for cleaning halogenated contaminants from groundwater. The process involves feeding contaminated groundwater through a trench containing a metal such as iron, under strict exclusion of oxygen, and over a lengthy period of time.

The above-mentioned metal systems show the reductive dechlorination of chlorinated hydrocarbons in aqueous solutions by iron metal under the exclusion of oxygen. An oxygen-free environment must be utilized for these reactions to proceed. A disadvantage of these systems is the formation of insoluble precipitates that block the pore spaces of an in situ iron wall or ex situ metal packed column.

There is a need for metal wall or column remediation processes that effectively clean-up aqueous solutions contaminated with chlorinated hydrocarbons that have oxygen present. There is also a need for a reactive wall or column process that will not be blocked by the formation of insoluble precipitates that form in the wall or column. There is a further need for a low maintenance system that extends the operational life of the reactive wall or packed column.

SUMMARY OF THE INVENTION

This invention satisfies these needs by providing a method comprising passing an aqueous solution contaminated with halogenated hydrocarbons through a tiered metal wall or column comprising zones of graduated sizes of metal particles where a first zone consists essentially of a reactive sink with large size metal particles that entrap precipitates formed from a reaction between said aqueous solution and said large metal particle, where a second zone is adjacent to the first zone and third zone, and consists essentially of intermediate size metal particles that filter residual precipitates from zone one, and where a third zone is adjacent to the second zone and consists essentially of small size metal particles that dehalogenate substantially all of the halogenated hydrocarbons, thereby removing contaminants from the aqueous solution.

"Substantially all" of the halogenated hydrocarbons means that about 5 parts per billion or less of the halogenated hydrocarbon remain in the solution after treatment by the method of this invention.

The practice of this invention decreases the blockage of pore spaces between the particles used in metal walls and metal packed columns that chemically reduce halogenated hydrocarbons. The reactions of metals, such as iron, with water, oxygen, carbonates, and sulfates, are complex, resulting in the formation of precipitates of oxides, oxyhydroxides, carbonates, and sulfates. The design of the tiered metal wall or column of this invention prevents these precipitates from blocking pores, and further prevents the gelatinous masses that form from bridging metal particles together.

The practice of this invention is contemplated for use in treating contaminated aqueous solutions with chlorinated hydrocarbons such as trichloroethylene and tetrachloroethane. Other halogenated hydrocarbons, such as dichloroethylene, vinyl chloride, 1,1,1-trichloroethane, carbon tetrachloride, and chloroform, may also be treated by the method of this invention. Contaminated aqueous solutions include groundwater, wells, streams, run-off streams, ponds, waste water, and the like.

The process uses a reducing metal, such as iron, to detoxify dissolved chlorinated hydrocarbons in aerobic or anaerobic aqueous compositions by the removal of chlorine atoms. Conditions are induced that cause substitution of chlorine atoms by hydrogen atoms. The end products of the process are completely dechlorinated and non-toxic. Examples of end-products for chlorinated hydrocarbons treated by the process are ethane, ethene, methane, propane, butane, pentane, and chloride ions.

DESCRIPTION OF THE INVENTION

Using a tiered metal wall or column to reduce halogenated hydrocarbons in aqueous environments prolongs the life of the metal wall or column while efficiently removing contaminants from water. The design of the tiered wall or column allows for treatment of solutions that contain species, such as oxygen, that react with the metal, i.e. iron, to form reaction products. The tiered metal wall or column is divided into at least three zones with graduated-sizes of metal particles. Based on the method of this invention the reaction products are unable to rapidly plug the pores between the metal particles or bridge the metal particles together.

Iron is the metal of choice for the tiered metal wall or column of this invention. Other reducing metals, such as zinc, that chemically dehalogenate halogenated hydrocarbons are also contemplated for use. The method of this invention is described using iron as the reducing metal.

Figure 1:
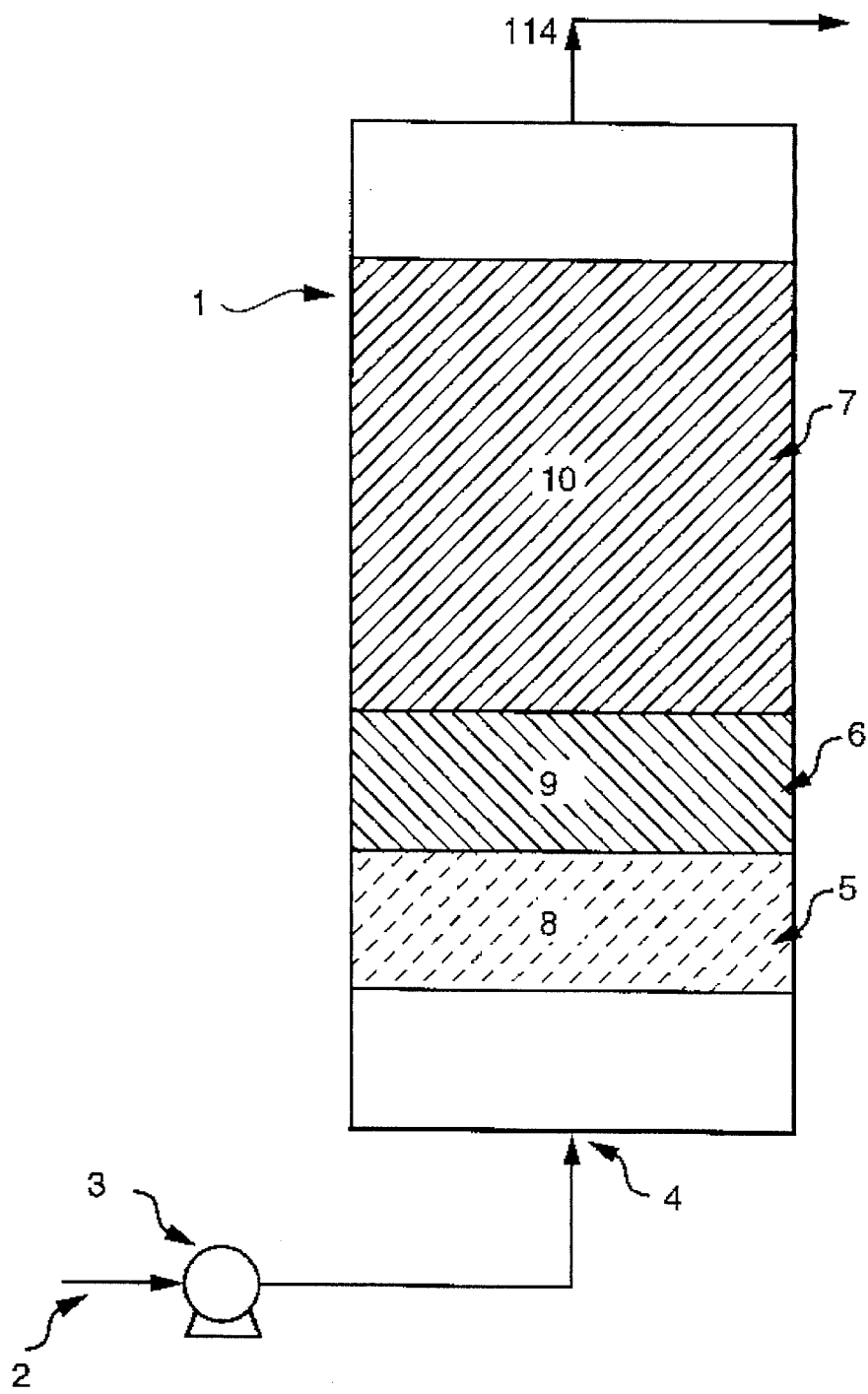
FIG. 1 is a drawing of a tiered metal column with three reaction zones for dehalogenating hydrocarbons.

The present invention is now demonstrated using iron as the metal packing and chlorinated hydrocarbons as the halogenated hydrocarbons. Referring to FIG. 1, there is shown a schematic diagram of a tiered metal column 1. The contaminated aqueous solution 2 enters at a pump 3 and enters 4 the column 1. The contaminated water passes through zone 1, which is also referred to as a reactive sink 5. The reactive sink 5 contains large iron particles 8 that react with oxygen and other species in the water to readily form precipitates. The water continues through zone 1 5 and travels to zone 2 6, which contains intermediate size iron particles 9. Zone 2 6 filters fine particles and precipitates from zone 1 5 and prevents the fine iron particles from falling from zone 3 7 to zone 1 5. Zone 3 7 contains the smallest size iron particles 10 and serves to chemically destroy substantially all of the chlorinated hydrocarbons present in the water. After the water has passed through the complete tiered column 1, it exits as treated water 11.

The largest iron particles at the entrance to the tiered iron wall or column serve as a reactive sink for the oxygen and any other readily precipitatous species in the water, i.e. carbonates and sulfates. Large iron particles offer an acceptable surface area for reaction with oxygen and any other species that react with iron to form precipitates. The packing of the large iron particles affords large pores and provides space for reaction products to precipitate while not completely blocking the pores. The large iron particles have limited surface contact with each other so that particle bridging is reduced. By particle bridging is meant joining of adjacent particles at their point of contact by small precipitates, colloids, or gels.

The large iron particles are located in zone one in the tiered wall or column. The size of the iron particles is about 5–30 millimeter in diameter or length, and the preferred size is about 5–20 millimeters. The particle shape in each zone can be spherical or irregular shape.

Large iron particles have a lower reactivity toward the chlorinated hydrocarbons to be destroyed due to their lower surface area. Thus, it is important in this invention to gradually decrease the iron particle size in each zone until a particle size is provided, such as in zone three, that is suitable for reacting with chlorinated hydrocarbons at an effective reaction rate.

Intermediate size iron particles for zone 2 are about 1–5 millimeters in diameter or length. A preferred intermediate size is about 1–3.4 millimeters. Zone 2, the intermediate zone, serves to filter fines, i.e. very small particles, and precipitates that travel from zone 1, while also preventing the smallest iron particles from moving from zone 3 to zone 1.

Small size iron particles for zone 3 are about 0.1–1 millimeter in diameter or length. A preferred small size is about 0.5–1 millimeter. Zone 3 or the last zone, serves to dechlorinate substantially all of the chlorinated hydrocarbons, such as trichloroethylene and dichloroethylene.

The length of each zone is determined by the flow velocity, the composition of the water, the amount of contaminants present, the desired contaminant effluent level, the reaction rate constant, and the desired life of the tiered iron wall or column. The length can be designed based on commonly known engineering principles to one skilled in the art. The flow velocity can be about 0.001–1000 feet per day with a pressure drop of less than 50 pounds per square inch. Generally, this process is suitable for water streams containing up to saturation levels of oxygen, about 9 parts per million, and about 10–500 parts per million carbonate.

This invention is useful for in situ and ex situ applications. Tiered iron walls are contemplated for in situ applications and tiered iron columns are contemplated for ex situ applications.

The following example further serves to demonstrate this invention.

EXAMPLE

To demonstrate the dechlorination of trichloroethylene and dichloroethylene in water by iron metal in the method of this invention, a column was packed with iron filings of graduated sizes in a tiered zone and a separate column was packed with one size of fine iron particles only. Three examples are given showing the results from de-ionized water passing through a column packed with one size of fine iron filings; groundwater contaminated with chlorinated hydrocarbons passing through a column packed with one size of iron filings; and groundwater contaminated with chlorinated hydrocarbons passing through a tiered column.

During the operation of the columns, the feed solution and the effluent from each column were sampled for trichloroethylene, dichloroethylene, dissolved gases such as ethene and ethane, chloride, and dissolved oxygen.

Throughout the test, pressure was recorded as an indicator of extensive pore blockage. Plugging of the columns due to complete pore blockage across a cross section or extensive particle bridging resulted in excessive pressure build-up, since the columns were supplied water by a positive displacement pump.

EXAMPLE 1

Buffered, deionized water to which was added about 40 mg per liter calcium carbonate with a pH adjusted to 7–8.5 by carbon dioxide addition, had a dissolved oxygen content of about 1–3 parts per million. For a flow rate of 12 milliliters per minute, there was a low and steady pressure drop across a column with only fine iron particles, about 0.5–1 millimeter size.

EXAMPLE 2

Figure 2:
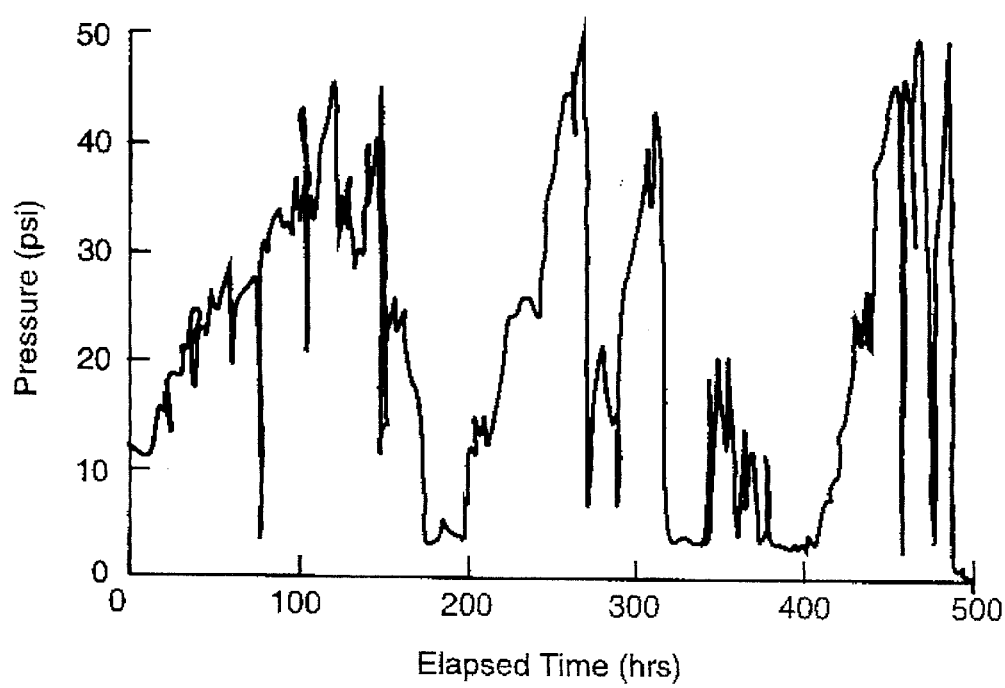
FIG. 2 is a graph showing the pressure drop across a column filled with fine iron particles of one size at 12 milliliters per minute flow rate of contaminated groundwater.

Groundwater, having a bicarbonate alkalinity of about 380 parts per million, a pH of 7–8, and a dissolved oxygen content of about 3–6 parts per million was spiked with 4 parts per million trichloroethylene and 600 parts per billion dichloroethylene. The groundwater was passed through a column containing only fine iron particles, about 0.5–1 millimeter size. A sudden high pressure drop developed across the column. FIG. 2 shows the pressure history across the column for the same flow rate as used with the buffered deionized water in Example 1.

When the column was examined, a solid mass of precipitate was in the bottom of the column. Scraping out and replacing the bottom ½ inch of iron of this column lowered the pressure. This accounts for the dips in pressure seen in FIG. 2. However, the pressure always rose again, which hindered the operation of this column. This pressure history indicates significant plugging of pores and bridging of iron particles.

EXAMPLE 3

The tiered metal column of this invention was demonstrated by packing about four inches of large size iron particles of about 5–12 millimeter size in zone one, followed by four inches of intermediate size iron particles in zone two having a size of about 1–3.4 millimeter, and four inches of small size iron particles, about 0.5–1 millimeter. The column internal diameter was about 25 millimeters. The dimensions of the column were chosen for laboratory experimental tests only, and do not correlate to an optimum size for production use.

Figure 3:
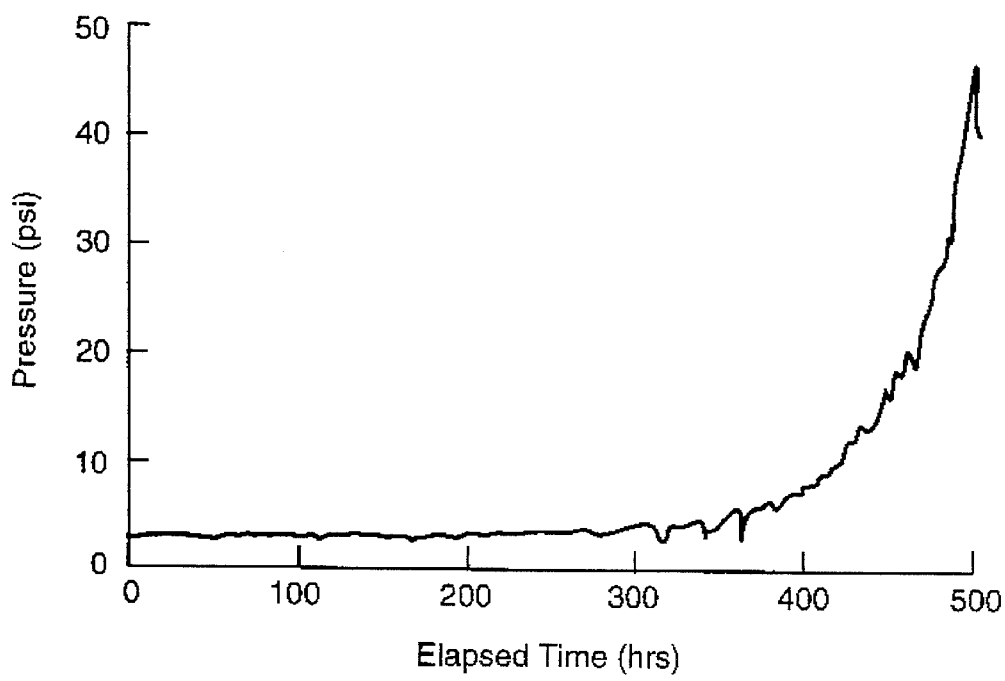
FIG. 3 is a graph showing the pressure drop acrosss a tiered iron column with graduated iron particle sizes at 12 milliliters per minute flow rate of contaminated groundwater.

The groundwater had the same concentrations of contaminants as Example 2, and the same flow rate was used. In this column, the onset of pressure problems was significantly delayed. FIG. 3 shows the pressure drop across the column at a flow rate of about 12 milliliters per minute of contaminated groundwater.

Comparing FIG. 2 and FIG. 3, it is seen that for treating groundwater, the tiered metal column of this invention had a much longer lifetime than the packed column with only small size iron particles. The tiered column operated for more than 600 hours before pressure built up. The column with only small size iron particles operated for less than 100 hours when excessive pressure built up.

It should be noted that the design of the system influences the life of the column or wall. Also, for use in metal walls, the zones are generally placed horizontal, whereas in columns the zones are placed vertically. There can be multiple columns or walls employed in the method of this invention. For instance, several walls or columns placed adjacent to each other or in series, each with a different size metal particle of graduated sizes, can be employed.

What is claimed:

1. A method comprising passing an aqueous solution contaminated with halogenated hydrocarbons through a tiered iron wall or column comprising at least three zones of graduated sizes of iron particles where a first zone consists essentially of a reactive sink with first zone iron particles of a size about 5–30 millimeters that entrap precipitates formed from a reaction between said aqueous solution and said first zone iron particle, where a second zone is adjacent to the first zone and third zone, and consists essentially of second zone iron particles of a size about 1–5 millimeters that filter residual precipitates from zone one, and where a third zone is adjacent to the second zone and consists essentially of third zone iron particles of a size about 0.1–1 millimeters that dehalogenate substantially all of the halogenated hydrocarbons, thereby removing contaminants from the aqueous solution.

2. A method according to claim 1 where the aqueous solution is selected from the group consisting of groundwater, wells, streams, ponds, waste water, run-off streams, and mixtures thereof.

3. A method according to claim 1 where the halogenated hydrocarbon is a chlorinated hydrocarbon.

4. A method according to claim 3 where the chlorinated hydrocarbon is selected from the group consisting of trichloroethylene, dichloroethylene, vinyl chloride, 1,1,1-trichloroethane, carbon tetrachloride, chloroform, and mixtures thereof.

5. A method for dechlorinating contaminant chlorinated hydrocarbons in aqueous solutions comprising: passing a contaminated chlorinated hydrocarbon aqueous solution through a tiered iron wall or tiered iron column comprising at least three zones of graduated sizes of iron particles where a first zone consists essentially of a reactive sink with large size iron particles about 5–30 millimeters, that entrap precipitates formed from a reaction between said contaminated aqueous solution and said large iron particle, where a second zone is adjacent to the first zone and third zone, and consists essentially of intermediate size iron particles about 1–5 millimeters, that filter residual precipitates from zone one, and where a third zone is adjacent to the second zone and consists essentially of small size iron particles about 0.1–1 millimeters, that dechlorinate substantially all of the chlorinated hydrocarbons, thereby removing contaminants from the aqueous solution.

* * * * *